United States Patent [19]

Bähring

[11] Patent Number: 4,582,743

[45] Date of Patent: Apr. 15, 1986

[54] TOILET PAPER

[76] Inventor: Horst Bähring, An der Buche 22, D-6109 Mühltal 1, Fed. Rep. of Germany

[21] Appl. No.: 558,158

[22] Filed: Dec. 5, 1983

[30] Foreign Application Priority Data

Dec. 3, 1982 [DE] Fed. Rep. of Germany ....... 3244721

[51] Int. Cl.[4] .............................................. B32B 3/04

[52] U.S. Cl. ...................................... 428/125; 428/43; 428/121; 428/124; 270/42

[58] Field of Search ................. 428/43, 121, 189, 125, 428/130, 156, 181, 124; 156/204; 221/98; 270/41, 42

[56] References Cited

U.S. PATENT DOCUMENTS 550,280 11/1895 Lorenz ............................ 428/191 X 2,033,621 3/1936 Freedman ............................. 428/43

*Primary Examiner*—Alexander S. Thomas

*Attorney, Agent, or Firm*—Michael J. Striker

[57] ABSTRACT

The invention concerns toilet paper as it is usually manufactured in rolls. Considering that in use the central area of the paper is particularly subject to tearing and strain, the toilet paper of this invention has a central area which is significantly thicker than its edges. The greater thickness in the central area can be achieved, for example, by having normal width or by Z-folding a paper strip such that the overlap created by the Z-fold lies on the longitudinal axis of the strip.

A manufacturing method and equipment using rollers and guides particularly suited for the performance of the manufacturing method are described.

7 Claims, 13 Drawing Figures

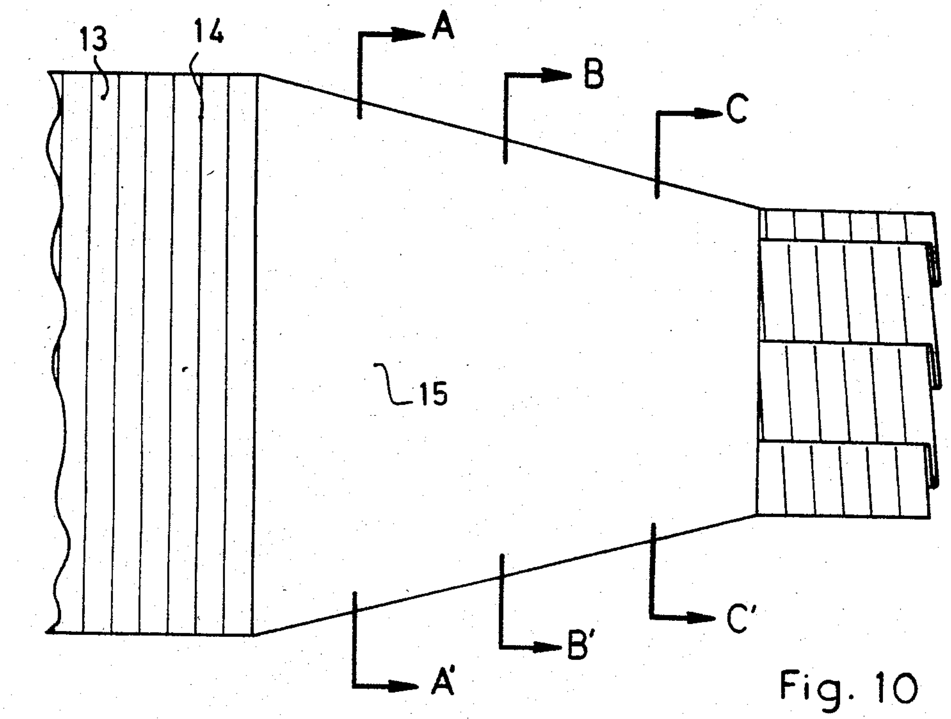
Fig. 10
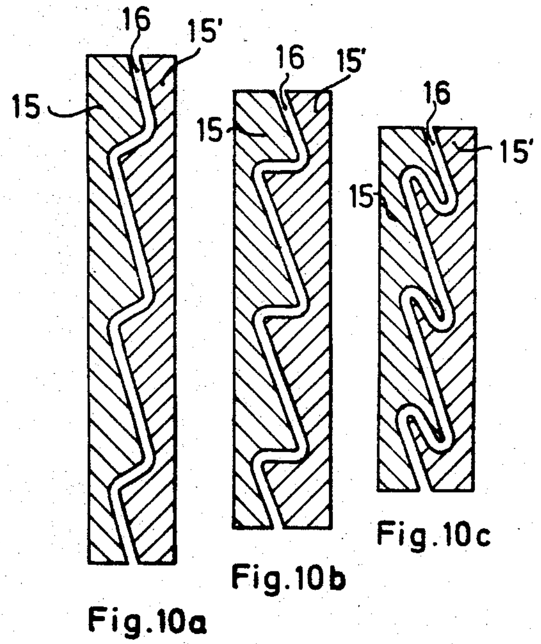
Fig.10a
Fig.10b
Fig.10c

TOILET PAPER

BACKGROUND OF THE INVENTION

The invention concerns toilet paper. Toilet paper is usually manufactured as rolls; for some uses it may be precut into sheets of suitable sizes.

Standard types of toilet paper are made of crepe paper or tissue paper arranged in one or more plies. An essential criterion for the quality of the paper is its resistance to tearing when wet, its so-called "wet strength". The toilet paper ordinarily available has inadequate wet strength. The consequences thereof are immediately obvious and require no elaboration.

In order to compensate for this shortcoming, the user must fold several sheets over one another. A means of avoiding this need would be increasing the number of plies in the paper during manufacture. Both of these practices are undesirable due to their inefficient use of paper.

It is known from German utility model No. 19 39 788 to add an additional paper ply onto a paper strip along the longitudinal axis of said paper strip, or to insert an additional narrow paper strip between two plies having normal width. Unfortunately the manufacture of this kind of toilet paper has shown to be rather difficult.

SUMMARY OF THE INVENTION

It is a general object of this invention to specify toilet papers which demand reduced usage of paper while providing the required strength.

This is achieved by a toilet paper having a greater thickness in its central area than that at its edges. This offers the advantage of providing both central and edge areas with thicknesses sufficient to meet the demands placed upon them in use while significantly reducing the weight and amounts of paper required compared to standard toilet papers having uniform thicknesses over their full widths.

Since toilet paper is manufactured and used in large quantities, the approximate 30% savings in the amounts of wood required for manufacture will be a matter of economic importance.

Useful is to reinforce the central area of the paper with a Z-fold along its longitudinal axis. The invention concerns methods for the manufacture of Z-folded toilet paper, as well as equipment for the performance of these methods.

Extensions and additional forms of the invention are designated in the rights claimed and are described in the—at times schematically simplified—figures displaying examples of the different forms of the invention. In these figures, parts which are related to one another are given the same reference symbols, and all details which are not required for the explanation of the invention have been omitted.

BRIEF DESCRIPTION OF THE DRAWINGS

FIG. 10 is a simplified drawing of another equipment for the manufacture of toilet paper, shown in plan view, FIGS. 10A, 10B and 10C are sections perpendicular through the paper guides of the equipment of FIG. 10 in the AA' plane, in the BB' plane and in the CC' plane respectively, perpendicular to the transport direction of the paper strip, presented as structural detail.

DESCRIPTION OF THE PREFERRED EMBODIMENTS

Figure 1:
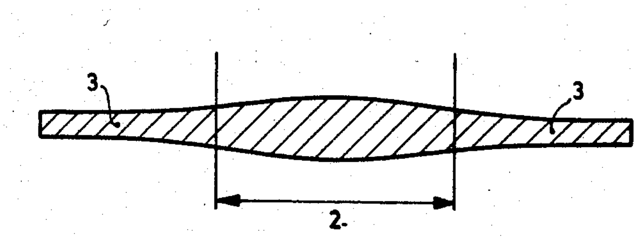
FIG. 1 is a cross-section through a toilet paper manufactured according to the invention.

FIG. 1 illustrates the principle of the invention. If the paper has been reinforced in the central area 2, for example, by suitably controlling the manufacturing process, then an increased resistance to tearing will be obtained in the more heavily stressed central area, while the edge areas 3 maintain strength adequate for the stresses which they will encounter in use. A significant savings, which can be more than 30%, in the amounts of paper used is achieved in comparison to standard types of toilet paper which have uniform thicknesses over their full areas. This will substantially reduce the amounts of wood required for the large quantities of toilet paper which are manufactured.

Figure 2:
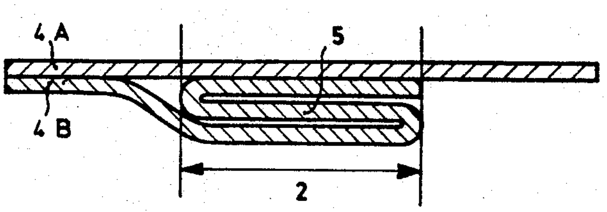
FIG. 2 is a further version, with a reinforced central section created by Z-folding a strip of paper, seen in cross-section.

In the version shown in FIG. 2 the reinforcement of the central area is achieved by folding a strip of paper. The paper ply 4B is folded upon itself twice before it is bonded to the paper ply 4A, so that the central area contains four plies, the right-hand edge has a single ply, and the left-hand edge has two plies.

Figure 3:
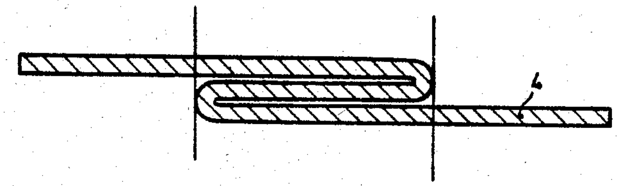
FIG. 3 is a simpler version, generated by Z-folding a paper strip, seen in cross-section.
Figure 4:
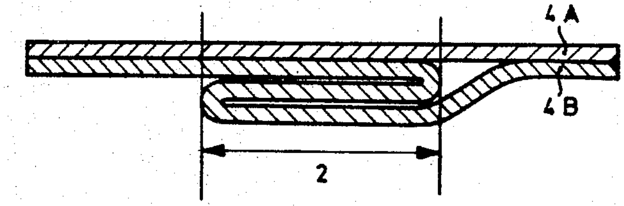
FIG. 4 is another two-ply version, in which one ply is Z-folded, seen in cross-section.

A reinforcement of the central area to thrice that of the edge areas may be achieved by Z-folding a strip 4, as shown in FIG. 3. If a two-ply strip is to be used, when the strip 4A can remain unaltered, while the strip 4B is Z-folded so that the central area 2 has a thickness twice that of the edge zones, as shown in FIG. 4.

Figure 5:
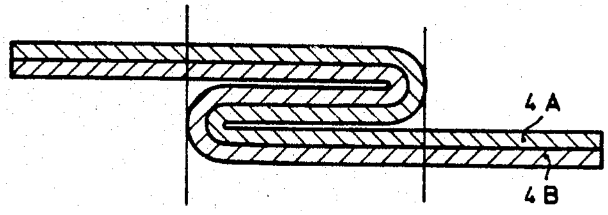
FIG. 5 is a two-ply version, in which both plies are Z-folded, seen in cross-section.

FIG. 5 shows a particularly simply-manufactured version in which the central area 2 has thrice the thickness of the edge zones, achieved by Z-folding the strips 4A and 4B.

Figure 6:
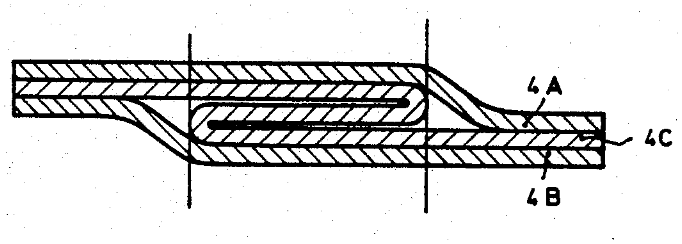
FIG. 6 is a three-ply version, in which the inner ply is Z-folded, seen in cross-section.

If a three-ply strip is to be used for the manufacture of the toilet paper, then the two outer plies, 4A and 4B, can be left unaltered and only the inner ply Z-folded to strengthen the central area 2, as indicated in FIG. 6.

Each folded strip has folded edges which are bonded to the plies so as to form a single piece therewith.

Figure 7:
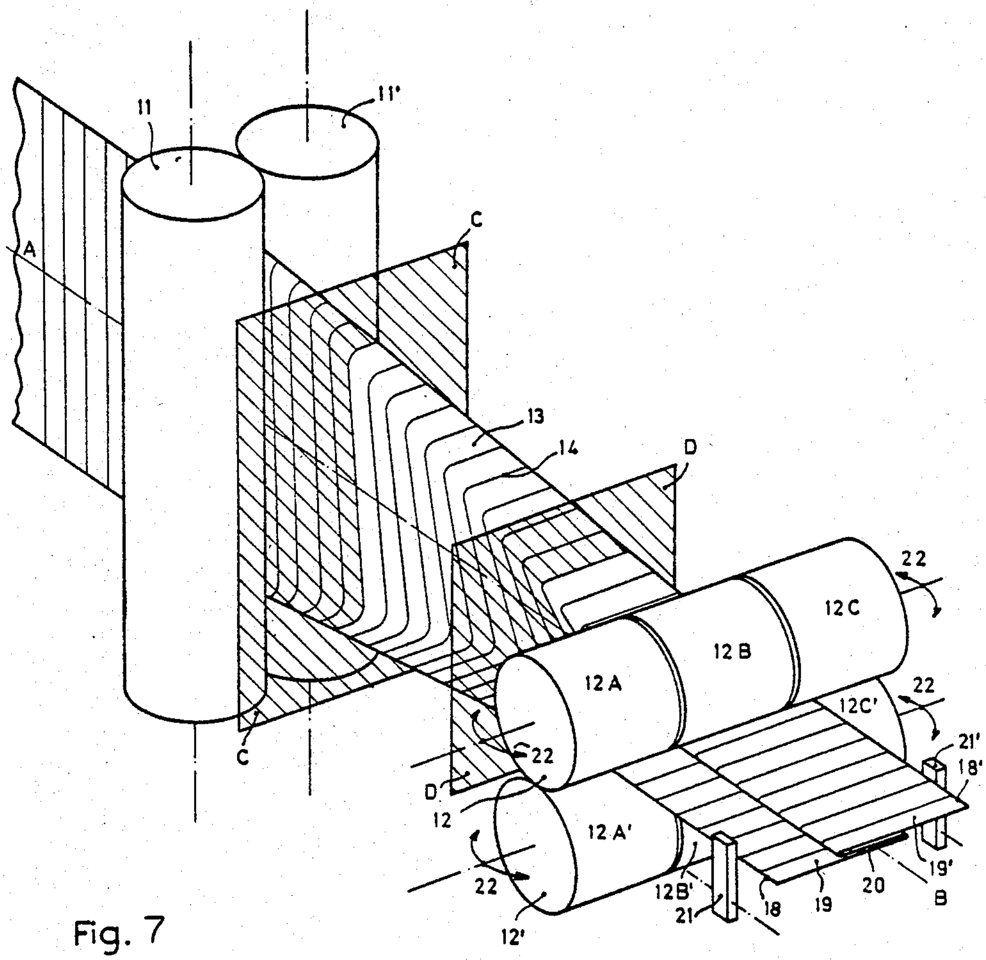
FIG. 7 is a greatly simplified drawing of equipment for the manufacture of toilet paper, shown in an isometric view.

The system shown in FIG. 7 for the accomplishment of the folding along the longitudinal axis of the paper strip has two pairs of rollers, 11—11' and 12—12', arranged perpendicularly to one another and to the longitudinal axis of the paper, AB. The paper strip 13 enters the system unfolded at roller pair 11—11' and leaves it folded parallel to its longitudinal axis after passing through the roller pair 12—12'. In order to better show this folding operation, the surface of the paper 13, has been drawn in FIG. 7 provided with a hatch-pattern.

Figure 8:
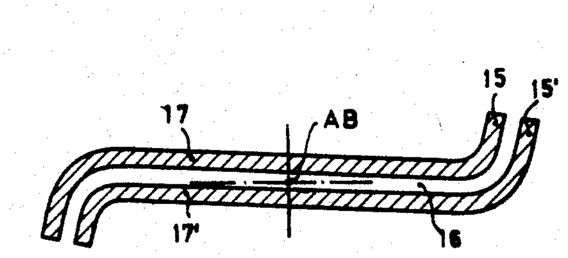
FIG. 8 is a section through the paper guides in the C—C plane, perpendicular to the transport direction of the paper strip, presented as a structural detail.
Figure 9:
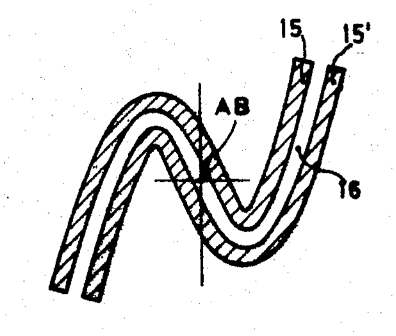
FIG. 9 is a section through the paper guides in the D—D plane, perpendicular to the transport direction of the paper strip, presented as a structural detail.

The space between the two roller pairs, 11—11′ and 12—12′, contains two paper guides formed from sheet material. These guides are not shown in FIG. 7 in order to simplify the drawing. Sections through the guides perpendicular to the longitudinal axis of the paper AB are shown in FIGS. 8 and 9. Both of the paper guides 15 and 15′, have the same form and are mounted separated slightly from one another. These guides define a narrow included gap 16, through which the paper 13 is fed. The form of these paper guides changes continuously along the paper transport direction. At the roller pair 11—11′, the paper guides are nearly planar and equidistant from one another (17 and 17′ in FIG. 8); they continuously evolve into increasingly curved and folded surfaces, with cross-sections like those shown in FIG. 9 at the roller-pair 12—12′. The roller pair 11—11′ controls primarily the paper transport, while the roller-pair 12—12′ performs the folding operation in conjunction with the paper guides 15 and 15′.

The paper guides 15 and 15′ simplify the startup of the system. Once the system is in operation, they can be at least partially withdrawn.

In an actual operational version of the system, the rollers 12 and 12′ should ideally each be made up of three rollers 12A, 12B, 12C, and 12A′, 12B′, and 12C′. The roller-pairs at the two edges of the paper strip are to be dimensioned in width such that they grip only the single-ply areas 19 and 19′ of the paper; the roller-pair 12B and 12B′, which lies between these two roller-pairs is to be dimensioned such that its rollers contact only the central area of the paper 13. This center roller-pair performs the longitudinal folding while the two roller-pairs at the outer edges 18 and 18′ of the paper perform control functions. In conjunction with the sensors 21 and 21′, indicated in FIG. 7, which scan the edges 18 and 18′ of the paper, the width of the single-ply sections of the paper 19 and 19′ may be adjusted and regulated as required by a slight tilting of the control rollers 12A–12C and/or 12A′–12C′, off their axes in the horizontal plane.

For the manufacture of various specific types of toilet papers, foldings, such as double Z-folding, or the creation of parallel longitudinal pleats across the paper width, may be obtained by an appropriate shape of the paper guides as shown in FIG. 10.

In the apparatus illustrated in FIG. 10 a tissue web 13 having a large width enters the device from the left side and leaves it on the right side with several Z-foldings in longitudinal direction, after having passed the guide plates 15, 15′. To produce toilet paper this paper web is cut in single strips with one Z-folding each in longitudinal direction.

Cross sections of the guide plates along the sections AA′, BB′, CC′ are shown in FIGS. 10A, 10B, 10C.

I claim:

1. Toilet paper, comprising: at least one individual contiguous paper ply forming a strip having a central zone with a thickness and a marginal zone with a thickness, said ply having a folded strip portion which is of one piece with a remaining portion of said ply and bonded to said ply, and arranged so that said central zone is thicker than said marginal zone.

2. Toilet paper, comprising: two individual contiguous paper plies forming a strip having a central zone with a thickness and a marginal zone with a thickness, and a folded strip portion which is situated between said two plies, formed of one piece with a remaining portion of one of said two plies, and arranged so that said central zone is thicker than said marginal zone.

3. Toilet paper as defined in claim 1, wherein said folded strip portion is permanently bonded to one of said two plies.

4. Toilet paper as defined in claim 3, wherein said folded strip portion has folded edges, said folded edges being bonded to said outer plies so as to form one piece therewith.

5. Toilet paper, comprising: two individual contiguous paper plies forming a strip having a central zone with a thickness and a marginal zone with a thickness and also having a first and a second longitudinal edge, and a folded strip portion which is arranged so that said central zone is thicker than said marginal zone, one of said plies being folded and having overlapping folds so as to form said folded strip portion of one piece with a remaining portion of said one ply, and said folded strip portion having longitudinal fold edges, one of said fold edges bordering said first longitudinal edge, and another of said fold edges bordering said second longitudinal edge, said one folded ply being folded at said another fold edge so that one of said overlapping folds overlaps the remaining overlapping folds to form an outer ply.

6. Toilet paper, comprising: two individual contiguous paper plies forming a strip having a central zone with a thickness and a marginal zone with a thickness, and a folded strip portion which is arranged so that said central zone is thicker than said marginal zone, said two individual plies both jointly folded with a plurality of folds in said central zone to form said folded strip portion of one piece with said plies, each of said folds in said folded portion being bonded to one of said individual plies of said central zone of said strip.

7. Toilet paper, comprising: three individual contiguous paper plies forming a strip having a central zone with a thickness and a marginal zone with a thickness, and a folded strip portion which is of one piece with a remaining portion of one of said plies and arranged so that said central zone is thicker than said marginal zone, said one ply being centrally provided between the other two plies and having three overlapping folds in said central zone so as to form said folded strip portion.

* * * * *